United States Patent [19]

Matsumoto et al.

[11] Patent Number: 4,728,764

[45] Date of Patent: Mar. 1, 1988

[54] APPARATUS FOR DETECTING DISCHARGE GAP IN ELECTRIC DISCHARGE MACHINING

[75] Inventors: Katsuhiro Matsumoto; Akira Fujii, both of Tokyo, Japan

[73] Assignee: NEC Corporation, Japan

[21] Appl. No.: 696,780

[22] Filed: Jan. 31, 1985

[30] Foreign Application Priority Data

Feb. 1, 1984 [JP] Japan .................................. 59-17491

[51] Int. Cl.$^4$ .............................................. B23H 1/02
[52] U.S. Cl. .................................. 219/69 G; 219/69 C
[58] Field of Search ................ 219/69 S, 69 P, 69 M, 219/69 C, 69 G; 364/474, 475

[56] References Cited

U.S. PATENT DOCUMENTS

| 2,996,638 | 8/1961 | Webb | 219/69 G |
|---|---|---|---|
| 3,437,781 | 4/1969 | Webb | 219/69 G |
| 3,812,317 | 5/1974 | De Bont et al. | 219/69 P |
| 3,816,692 | 6/1974 | Ratmansky | 219/69 S |
| 3,860,779 | 1/1975 | Marendaz | 219/69 G |
| 3,883,793 | 5/1975 | Mizuhara et al. | 219/69 C |
| 3,916,138 | 10/1975 | Pfau | 219/69 C |
| 3,973,104 | 8/1976 | Ullmann et al. | 219/69 G |
| 3,999,028 | 12/1976 | Saito et al. | 219/69 C |
| 4,071,729 | 1/1978 | Bell, Jr. | 219/69 C |
| 4,078,163 | 3/1978 | Bell, Jr. et al. | 219/69 C |

FOREIGN PATENT DOCUMENTS

| 55-5202 | 1/1980 | Japan | 219/69 P |
|---|---|---|---|
| 2041574 | 9/1980 | United Kingdom | 219/69 C |

Primary Examiner—Philip H. Leung
Assistant Examiner—Geoffrey S. Evans
Attorney, Agent, or Firm—Ostrolenk, Faber, Gerb & Soffen

[57] ABSTRACT

A discharge gap measuring circuit measures the gap between a machining electrode and a workpiece in an electric discharge machining apparatus which uses a pulsed voltage as input. The circuit includes peak detecting means to measure the peak value of the voltage that develops between the machining electrode and the workpiece. Further, waiting time detecting means measure the time from the beginning of the input electrical pulse to the actual start of the discharge. An adder circuit combines the outputs of the two detecting circuits to produce a voltage representative of the actual gap. The output is used for controlling the position of the workpiece or the electrode to maintain the gap at a constant level so that a uniform workpiece finish and accelerated operation is obtained.

8 Claims, 7 Drawing Figures

APPARATUS FOR DETECTING DISCHARGE GAP IN ELECTRIC DISCHARGE MACHINING

BACKGROUND OF THE INVENTION

The present invention relates to an electric discharge machining apparatus and, more particularly, to an apparatus for detecting a discharge gap in the electric discharge apparatus.

In electric discharge machining, an intermittent DC voltage in the form of a pulse voltage is supplied between a machining electrode and a workpiece to thereby produce an electric discharge or an arc which is used to machine the workpiece to a desired depth and configuration. During the machining, the appearance of the electric discharge varies delicately in response to changes in the discharge gap between the machining electrode and the workpiece, even though the supplied DC voltage remains constant. As a result, the surface finish of the workpiece and the machining speed are undesirably varied.

For this reason, in actual machining, in order to obtain a uniform machining results and a desired machining speed, servocontrol is employed in which the discharge gap is measured by detecting a discharge voltage, and either the workpiece or the machining electrode is delicately controlled such that a desired discharge gap is maintained. One example of this kind of the servocontrol is shown in U.S. Pat. No. 4,339,650 to Tanaka et al, "ELECTRIC DISCHARGE MACHINING APPARATUS".

To measure the discharge gap, it is known to detect a discharge initiating voltage (peak voltage) or an average value of the discharge voltage which is measured at the machining electrode. By such conventional detecting methods, however, it is not possible to effect accurate detection over a wide gap range. For instance, with the conventional method which employs the peak voltage, which is always equal to the value of the supplied pulse voltage itself in an area where the discharge gap is wide, that is, in a case where discharge occurs after a certain period of time elapses after the supply of the pulse voltage, it is not possible to detect any change in the actual discharge gap. Also with the method which employs the average value, on the other hand, although it is possible to effect approximate detection in the area where the discharge gap is wide, it is not possible to accurately detect the discharge gap where the discharge gap is narrow, that is, in a case where discharge occurs immediately after the supply of the pulse voltage.

SUMMARY OF THE INVENTION

Accordingly, it is a primary object of the present invention to provide an improved discharge gap detecting apparatus which is capable of accurately detecting and operating over a very wide range of discharge gaps. The wide gap range includes both narrow gaps where the discharge initiating voltage is smaller than the voltage of the applied pulse voltage and wide gaps where the electric discharge occurs a long time after the pulse voltage. Thus, the overall range of the controllable discharge gap is enlarged.

According to the present invention, there is provided a discharge gap detecting circuit for an electric discharge machining apparatus which comprises: a peak detector which receives a discharge voltage and detects a peak voltage of the discharge voltage, a waiting time detector which detects a waiting time period between a leading edge of a supplied pulse voltage and a start of discharge occurrence, and a computing circuit which computes the discharge gap by combining the peak voltage and the waiting time period.

DESCRIPTION OF THE PREFERRED EMBODIMENT

Figure 1:
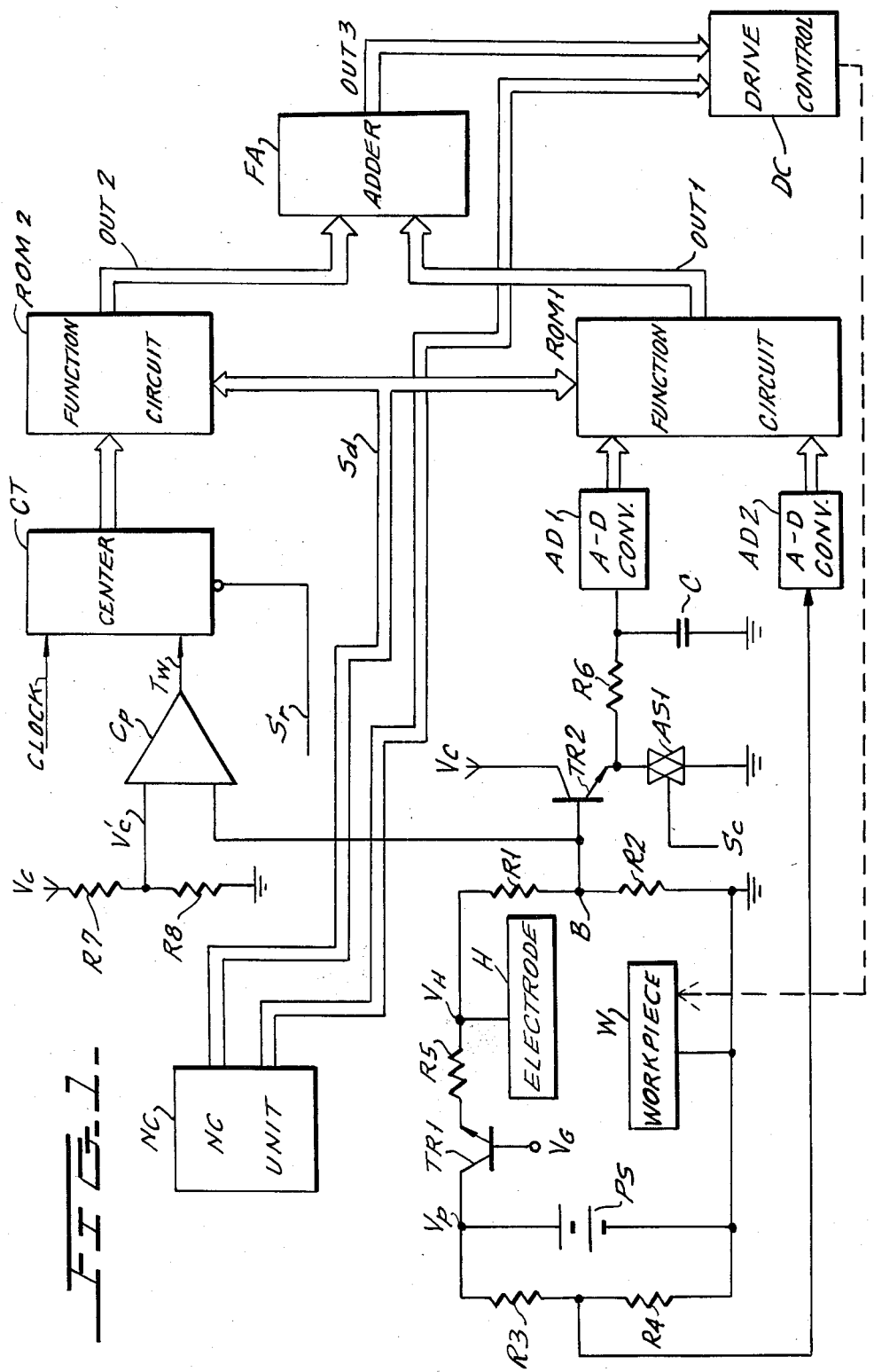
FIG. 1 shows a block diagram of an embodiment of the present invention.
Figure 2A:
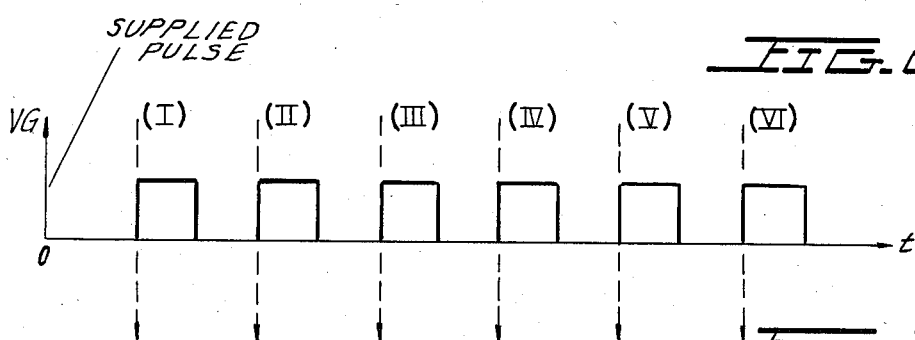
FIGS. 2(a) to 2(f) are timing charts for explaining the operation of the embodiment shown in FIG. 1.

The present invention will be described below in reference to an embodiment illustrated in the accompanying drawings. FIG. 1 shows the positive end of a DC power supply PS (voltage Vp) for machining connected to a collector of a switching transistor $TR_1$, while the negative end is grounded. An ON/OFF gate signal $V_G$ is supplied to the base of the switching transistor $TR_1$. From the emitter of the switching transistor $TR_1$, an intermittent pulse voltage, such as shown in FIG. 2(a), is supplied to a machining electrode H through a resistor $R_5$. On the other hand, the workpiece W is grounded.

Figure 2B:
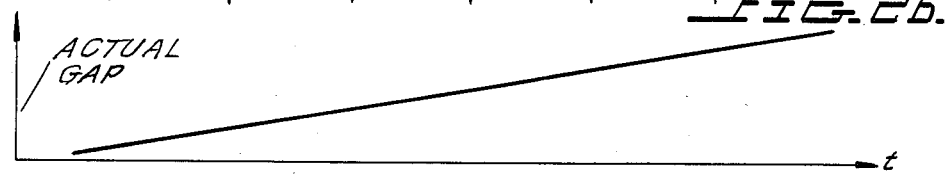
Figure 2C:
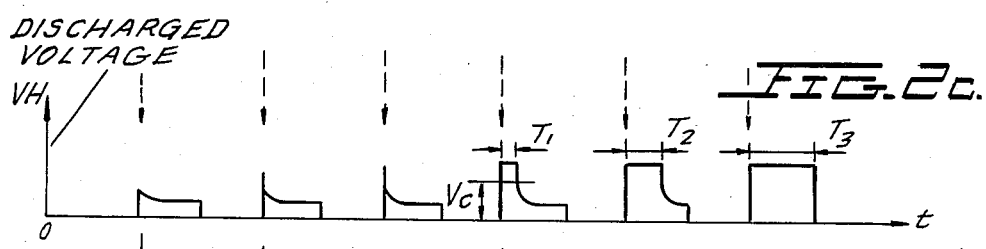

When the discharge gap between the machining electrode H and the workpiece W changes in the manner shown in FIG. 2(b), the waveform of the discharge voltage between the machining electrode H and the workpiece W is as that shown in FIG. 2(c). In FIGS. 2(b) to 2(f), the notations (I), (II) and (III) in FIG. 2(a) represent situations where the discharge gap is so narrow that discharge occurs during the duration of the pulse voltage (IV) and (V) represent cases where the discharge gap is sufficiently wide so that discharge occurs at the time when certain periods of time $T_1$ and $T_2$ elapse after the end of the pulse voltage; and (VI) represents a case where the discharge gap is so wide that no discharge occurs. As described above, in the cases (I), (II) and (III), it is possible to accurately measure the discharge gap by detecting the peak voltage. In the cases (IV) and (V), however, the peak voltage is always equal to the value of the supplied pulse voltage. Therefore, it is impossible to measure the gap accurately. On the other hands, in any of these cases, particularly in the cases (I), (II) and (III), it is not possible to accurately measure the discharge gap by using an average value.

The discharge voltage between the machining electrode H and the workpiece W, that is, a primary machining gap signal $V_H$, also appears across gap voltage detecting resistors $R_1$ and $R_2$. From the node between the resistors $R_1$ and $R_2$, a divided machining gap voltage B is obtained which is supplied to the base of a transistor $TR_2$. The collector of the transistor $TR_2$ is connected to a voltage $V_C$. The emitter of the transistor $TR_2$ is grounded through an analog switch $AS_1$ and is also connected through a resistor $R_6$ to one terminal of a capacitor C and an A/D converter $AD_1$. The other terminal of the capacitor C is grounded. A switching signal $S_C$, which causes the the emitter to connect to ground just before the supply of each pulse voltage, is supplied to the analog switch $A_S$.

Accordingly, when the machining pulse voltage is intermittently supplied, the capacitor C is charged, during pulse voltage, to the peak voltage which is proportioned to and lies between the machining electrode H and the workpiece W, that is, the peak voltage of the discharge voltage. The peak analog voltage on the capacitor C is converted by the A/D converter $AD_1$ into a digital signal, which is supplied to a function circuit $ROM_1$. On the other hand, the output voltage $V_P$ from the DC power supply PS appears across resistors $R_3$ and $R_4$. From the node between the resistors $R_3$ and $R_4$, a voltage proportional to other voltage PS is supplied to an A/D converter $AD_2$. A digital signal corresponding to the voltage of the power supply PS produced by the A/D converter $AD_2$ is supplied to the function circuit $ROM_1$. Machining data $S_d$ are also applied to the function circuit $ROM_1$. Accordingly, various data, that is, the gap data detected by using the peak voltage from the A/D converter $AD_1$, the data representing the voltage of the machining power supply PS, and the data $S_d$ representing a machining condition are applied to the function circuit $ROM_1$.

Figure 2D:
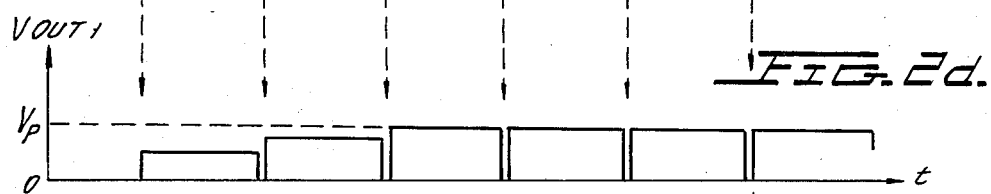

In the function circuit $ROM_1$, the gap data are modified in accordance with the supply voltage and the machining condition, and the modified gap data are delivered as compensated gap data $OUT_1$. Such function circuit can be easily realized by employing a read-only memory (ROM). FIG. 2(d) shows gap data detected by using the peak voltage. In each of the cases (I), (II) and (III), the data correctly represents the discharge gap.

The following is a description of gap-detecting by using a discharge waiting time. The discharge voltage B from the node between the resistors $R_1$ and $R_2$ is supplied to one input terminal of a comparator CP. The voltage $V_C$ is divided by the resistors $R_7$ and $R_8$, and the divided voltage $V'_C$ is supplied to the other input terminal of the comparator CP as a reference voltage. In this case, the voltage $V'_C$ is, as shown in FIG. 2(c), selected to have a value between the supplied voltage and a discharge maintaining voltage in which discharge is sustained. Accordingly, a pulse $T_W$ having widths corresponding to a waiting time ($T_1$ and $T_2$ in FIG. 2(c), for example), which is the interval from the start of the supply of the voltage to the moment when discharge begins, is delivered from the comparator CP and supplied to a binary counter CT.

Figure 2E:

A clock signal and a reset signal $S_r$ are supplied to the counter CT. In this case, the reset signal $S_r$ is generated just before the supply of the pulse voltage. As a result, numerical data corresponding to the waiting time is delivered from the counter CT. The value from the counter CT is supplied to a function circuit $ROM_2$, to which the machining data $S_d$ is also applied. The function circuit $ROM_2$ is supplied with gap data obtained by using the waiting time and the data $S_d$ representing the machining condition. The gap data from the counter CT is modified in accordance with the data $S_d$ and the modified data is delivered as compensated gap data $OUT_2$. FIG. 2(e) shows the gap data obtained by using the waiting time. As shown in FIG. 2(e), this data correctly represents a partial discharge gap which can not be detected by using the peak voltage.

Figure 2F:
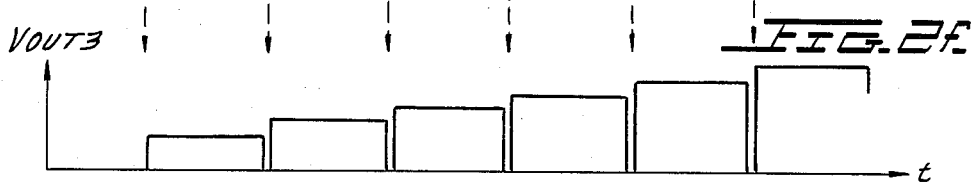

The gap data $OUT_2$ from the function circuit $ROM_2$ in accordance with the discharge waiting time and the gap data $OUT_1$ from the function circuit $ROM_1$ in accordance with the peak value are added together by an adder FA. FIG. 2(f) shows gap data $OUT_3$ output from the adder FA. As shown in FIG. 2(f), the gap data $OUT_3$ correctly represents the actual discharge gap between the machining electrode H and the workpiece W. The gap data $OUT_3$ delivered from the adder FA is supplied to a drive control circuit DC. The drive control circuit DC controls the discharge gap between the machining electroce H and the workpiece W to maintain a predetermined gap in accordance with the gap data $OUT_3$. It is to be noted that the drive control circuit DC is supplied with a machining instruction from a numerical control unit NC. The data $S_d$ representing the machining condition which vary in accordance with the machining electrode H, the workpiece W, a machining fluid, etc. is also supplied from the numerical control unit NC.

As described above, according to the present invention, the discharge gap can be accurately detected over a wide range by combining gap data measurements based on peak voltage and other gap data based on waiting time. Thereby, the present invention effectively enlarges the controllable discharge gap range, so that a greatly increased machining speed is made possible.

What is claimed is:

1. An apparatus for measuring the size of a discharge gap between a machining electrode and a workpiece in electric discharge machining in which a pulse voltage is applied between said machining electrode and said workpiece to thereby machine said workpiece, comprising:

peak detecting means responsive to a discharge voltage which develops between said machining electrode and said workpiece in response to the application of said pulse voltage for detecting a peak value of said discharge voltage;

first converting means for converting said peak value into first digital data;

waiting time detecting means responsive to said discharge voltage between said machining electrode and said workpiece for detecting a waiting time which is measured as the interval between the start of said given pulse voltage and the start of a discharge occurrence;

second converting means for converting said waiting time into second digital data;

first compensating means for compensating said first digital data in accordance with a machining condition to generate first compensated digital data;

second compensating means for compensating said second digital data in accordance with a machining condition to generate second compensated digital data; and means for determining said gap size solely on the basis of said first compensated digital data for a condition when said gap size is smaller than a predetermined value, and on the basis of the sum of said first compensated digital data and said second compensated digital data, when said gap size is larger than said predetermined value.

2. The apparatus as claimed in claim 1, wherein said waiting time detecting means includes a comparator for comparing said discharge voltage with a reference voltage which is set between the value of said pulse voltage and a discharge maintaining voltage and for producing a pulse signal having a pulse width corresponding to a period of time during which said discharge voltage is greater than said reference voltage.

3. The apparatus as claimed in claim 2, wherein said second converting means includes counting means for counting clock pulses during the period of said pulse voltage.

4. The apparatus as claimed in claim 1, wherein each of said first and second compensating means includes a read only memory.

5. An apparatus for measuring the size of a discharge gap between a machining electrode and a workpiece in electric discharge machining in which a plurality of pulse voltages are sequentially applied between said machining electrode and said workpiece to thereby machine said workpiece, comprising:

peak detecting means responsive to a discharge voltage which develops between said machining electrode and said workpiece in response to each one of said voltage pulses for detecting a peak voltage of said discharge voltage for each of said voltage pulses;

first converting means for converting said peak value into first digital data;

waiting time detecting means responsive to the discharge voltage between said machining electrode and said workpiece for detecting a waiting time between the leading edge of said pulse voltage and the start of a discharge occurrence for each of said voltage pulses; and second converting means for converting said waiting time into second digital data;

first compensating means for compensating said first digital data in accordance with a machining condition;

second compensating means for compensating said second digital data in accordance with a machining condition; and means for computing said gap size by adding the digital data from said first and second compensating means.

6. The apparatus as claimed in claim 5, wherein said waiting time detecting means includes a comparator for comparing said discharge voltage to a reference voltage of a value that is between said pulse voltage and a discharge maintaining voltage to produce a pulse signal having a pulse width indicative of a period of time during which said discharge voltage is greater than said reference voltage and wherein said second converting means includes counting means for counting clock pulses during said pulse width, said counting means being reset before each of said pulse voltages that are applied between said machining electrode and said workpiece.

7. An apparatus for measuring the size of a discharge gap between a machining electrode and a workpiece in electric discharge machining in which a pulse voltage is applied between said machining electrode and said workpiece to thereby machine said workpiece, comprising:

peak detecting means responsive to a discharge voltage which develops between said machining electrode and said workpiece for detecting a peak value of said discharge voltage;

waiting time detecting means responsive to said discharge voltage between said machining electrode and said workpiece for detecting a waiting time which is measured as the interval between the start of said pulse voltage and the start of a discharge current;

first modifying means for modifying said peak value in accordance with a machine condition and the magnitude of said pulse voltage to produce therefrom a first modified gap signal;

second modifying means for modifying said waiting time in accordance with a machine condition to produce therefrom a second modified gap signal; and means for determining said gap size by combining said first modified gap signal and said second modified gap signal.

8. The apparatus of claim 7, wherein each of said first and second modifying meams comprises a read only memory for storing values corresponding to respective characteristics of said first and second modifying means.

* * * * *